(12) United States Patent
Moroz et al.

(10) Patent No.: US 7,121,795 B2
(45) Date of Patent: Oct. 17, 2006

(54) METHOD AND APPARATUS FOR REDUCING ROTOR BLADE DEFLECTIONS, LOADS, AND/OR PEAK ROTATIONAL SPEED

(75) Inventors: Emilian Mieczyslaw Moroz, San Diego, CA (US); Kirk Gee Pierce, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 143 days.

(21) Appl. No.: 10/880,714

(22) Filed: Jun. 30, 2004

(65) Prior Publication Data

US 2006/0002797 A1    Jan. 5, 2006

(51) Int. Cl.
*F03D 7/04*    (2006.01)

(52) U.S. Cl. .............................................. 416/1; 416/41

(58) Field of Classification Search ................... 416/1, 416/30, 37, 41; 290/44
See application file for complete search history.

(56) References Cited

U.S. PATENT DOCUMENTS

| | | | |
|---|---|---|---|
| 4,160,170 A | 7/1979 | Harner et al. | |
| 4,348,155 A | 9/1982 | Barnes et al. | |
| 4,584,486 A | 4/1986 | Quynn | |
| 5,308,024 A | 5/1994 | Stetson, Jr. | |
| 5,599,168 A | 2/1997 | Lund | |
| 5,876,181 A | 3/1999 | Shin | |
| 6,137,187 A | 10/2000 | Mikhail et al. | |
| 6,215,199 B1 | 4/2001 | Lysenko et al. | |
| 6,320,272 B1 * | 11/2001 | Lading et al. | ................ 290/44 |
| 6,320,273 B1 | 11/2001 | Nemec | |
| 6,327,957 B1 | 12/2001 | Carter, Sr. | |
| 6,394,745 B1 | 5/2002 | Quraeshi | |
| 6,420,795 B1 | 7/2002 | Mikhail et al. | |
| 6,441,507 B1 | 8/2002 | Deering et al. | |
| 6,465,899 B1 | 10/2002 | Roberts | |
| 6,465,901 B1 | 10/2002 | Croes | |
| 6,600,240 B1 | 7/2003 | Mikhail et al. | |
| 6,609,889 B1 | 8/2003 | Vilsboll | |
| 6,619,918 B1 | 9/2003 | Rebsdorf | |
| 6,670,721 B1 | 12/2003 | Lof et al. | |
| 6,909,198 B1 * | 6/2005 | Ragwitz et al. | ................ 290/44 |
| 2003/0129059 A1 | 7/2003 | Nord | |
| 2003/0151259 A1 | 8/2003 | Feddersen et al. | |
| 2004/0067134 A1 | 4/2004 | Beauchamp et al. | |

FOREIGN PATENT DOCUMENTS

WO    WO 200205041 A2 *    1/2002

* cited by examiner

*Primary Examiner*—Edward K. Look
*Assistant Examiner*—Richard A. Edgar
(74) *Attorney, Agent, or Firm*—James E. McGinness, Esq.; Armstrong Teasdale LLP

(57) ABSTRACT

A method for reducing at least one of loads, deflections of rotor blades, or peak rotational speed of a wind turbine includes storing recent historical pitch related data, wind related data, or both. The stored recent historical data is analyzed to determine at least one of whether rapid pitching is occurring or whether wind speed decreases are occurring. A minimum pitch, a pitch rate limit, or both are imposed on pitch angle controls of the rotor blades conditioned upon results of the analysis.

20 Claims, 3 Drawing Sheets

METHOD AND APPARATUS FOR REDUCING ROTOR BLADE DEFLECTIONS, LOADS, AND/OR PEAK ROTATIONAL SPEED

STATEMENT REGARDING FEDERALLY SPONSORED RESEARCH & DEVELOPMENT

The U.S. Government has certain rights in this invention as provided for by the terms of Contract No. DE-AC36-83CH10093, Subcontract No. ZAM-7-13320-26 awarded by the Department of Energy/Midwest Research Institute, National Renewable Energy Laboratory Division.

BACKGROUND OF THE INVENTION

This invention relates generally to wind turbines, and more particularly to methods and apparatus for reducing peak loads, deflections, and/or rotational speed of wind turbines such as those that occur in a changing wind environment during normal operation.

Recently, wind turbines have received increased attention as environmentally safe and relatively inexpensive alternative energy sources. With this growing interest, considerable efforts have been made to develop wind turbines that are reliable and efficient.

Generally, a wind turbine includes a rotor having multiple blades. The rotor is mounted to a housing or nacelle, which is positioned on top of a truss or tubular tower. Utility grade wind turbines (i.e., wind turbines designed to provide electrical power to a utility grid) can have large rotors (e.g., 30 or more meters in diameter). Blades on these rotors transform wind energy into a rotational torque or force that drives one or more generators that may be rotationally coupled to the rotor through a gearbox. The gearbox steps up the inherently low rotational speed of the turbine rotor for the generator to efficiently convert mechanical energy to electrical energy, which is fed into a utility grid.

It has been observed that peak loads and/or rotational speeds of pitch regulated wind turbines often occur as a result of wind speed dropping suddenly to a level in which the pitch controller demands a rapid pitch toward minimum pitch followed by a large increase in wind speed. In the worst cases observed, the pitch controller cannot keep up with the wind change and large blade deflections, loads, and rotational speeds arise. In at least one known wind turbine configuration, a time lag is provided to limit the minimum pitch of the pitch control system. However, the time lag is based upon the power output of the turbine and is not always active to limit the minimum pitch.

BRIEF DESCRIPTION OF THE INVENTION

Some configurations of the present invention therefore provide a method for reducing at least one of loads, deflections of rotor blades, or peak rotational speed of a wind turbine. The method includes storing recent historical pitch related data, wind related data, or both. The stored recent historical data is analyzed to determine at least one of whether rapid pitching is occurring or whether wind speed decreases are occurring. A minimum pitch, a pitch rate limit, or both are imposed on pitch angle controls of the rotor blades conditioned upon results of the analysis.

In another aspect, some configurations of the present invention provide a method for reducing at least one of loads, deflections of rotor blades, or peak rotational speed of a wind turbine. The method includes controlling pitch angles of the rotor blades and providing the pitch angle control with a hysteresis loop to delay the pitch control.

In still another aspect, some configurations of the present invention provide a wind turbine that includes a rotor having one or more rotor blades. The wind turbine is configured to store recent historical pitch related data, wind related data, or both and to analyze the stored recent historical data to determine at least one of whether rapid pitching is occurring or whether wind speed decreases are occurring. The wind turbine is further configured to impose a minimum pitch, a pitch rate limit, or both on pitch angle controls of the rotor blades conditioned upon results of the analysis.

In yet another aspect, some configurations of the present invention provide a wind turbine that includes a rotor having one or more rotor blades. The wind turbine is configured to control pitch angles of the rotor blades, and delay the pitch angle control utilizing a hysteresis loop.

Configurations of the present invention thus provide a reduction in peak operating deflections, loads, and/or rotational speeds of wind turbine rotors. Moreover, configurations of the present invention are useful as a supplement to various known dynamic control methods.

DETAILED DESCRIPTION OF THE INVENTION

The present invention is related to the reduction of peak loads, deflections, and/or rotational speed of wind turbines such as those that occur in a changing wind environment during normal operation. Technical effects of the present invention therefore include a reduction in peak operating deflections, loads, and/or rotational speeds of wind turbine rotors, and/or the supplementing of various known dynamic control methods for these purposes.

In some configurations, pitch angles of rotor blades are controlled dependent upon measured data and minimum pitch angles and/or rates are limited based upon an analysis of the measured data. The pitch is allowed to vary within this minimum limitation a certain amount below a recent historically measured or determined value, but is limited in terms of a minimum value and/or rate substantially below this value.

Also in some configurations, pitch angles of rotor blades are controlled dependent upon recent historical data. The pitch angle control is provided with a hysteresis loop to delay the pitch control.

Neither strategy need be limited to a knee of the power curve, but can be made available throughout a normal operating range of a wind turbine in which loads rise to levels that could be structurally significant.

Figure 1:
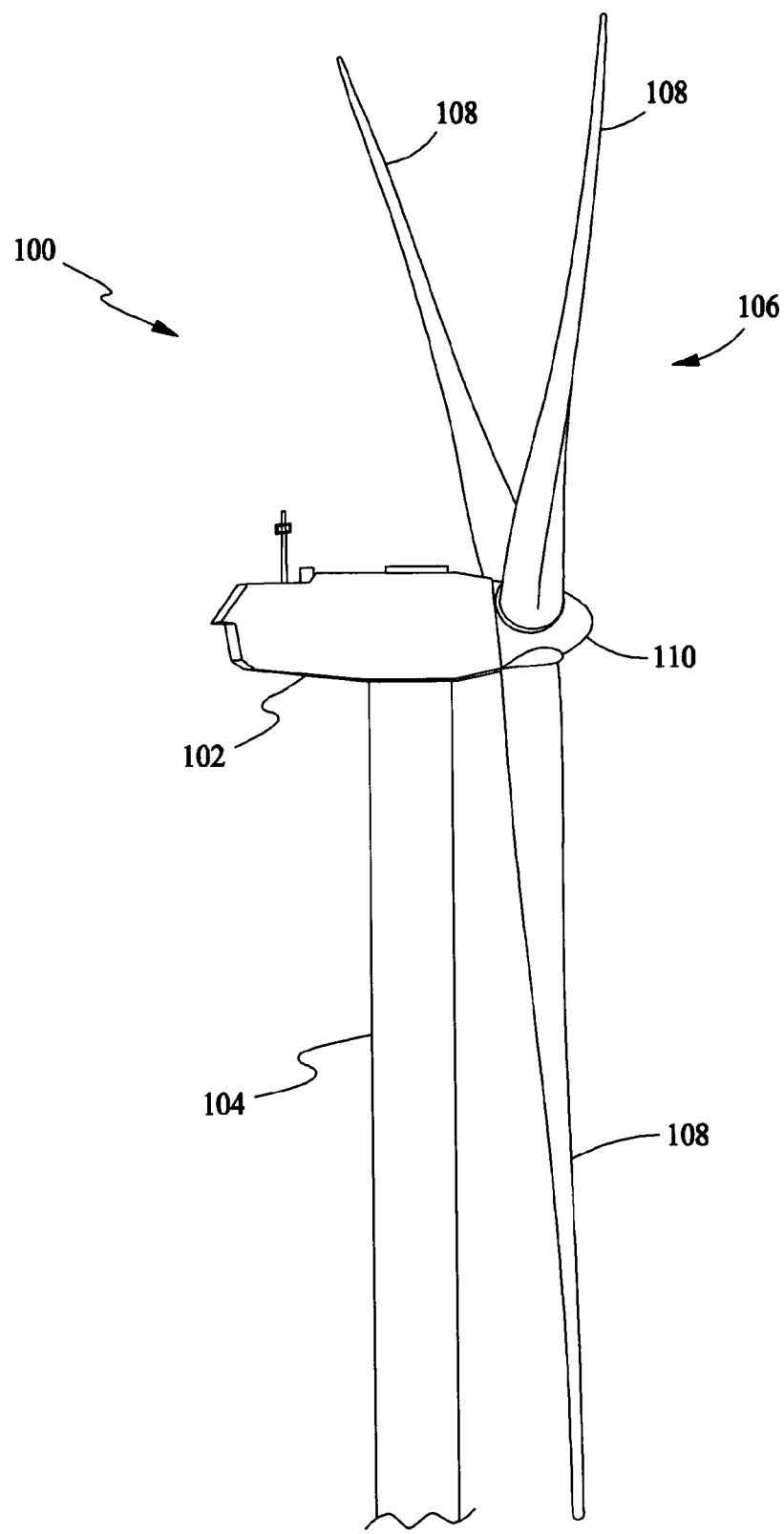
FIG. 1 is a drawing of an exemplary configuration of a wind turbine.

In some configurations and referring to FIG. 1, a wind turbine 100 comprises a nacelle 102 housing a generator (not shown in FIG. 1). Nacelle 102 is mounted atop a tall tower 104, only a portion of which is shown in FIG. 1. Wind turbine 100 also comprises a rotor 106 that includes one or more rotor blades 108 attached to a rotating hub 110. Although wind turbine 100 illustrated in FIG. 1 includes three rotor blades 108, there are no specific limits on the number of rotor blades 108 required by the present invention.

Figure 2:
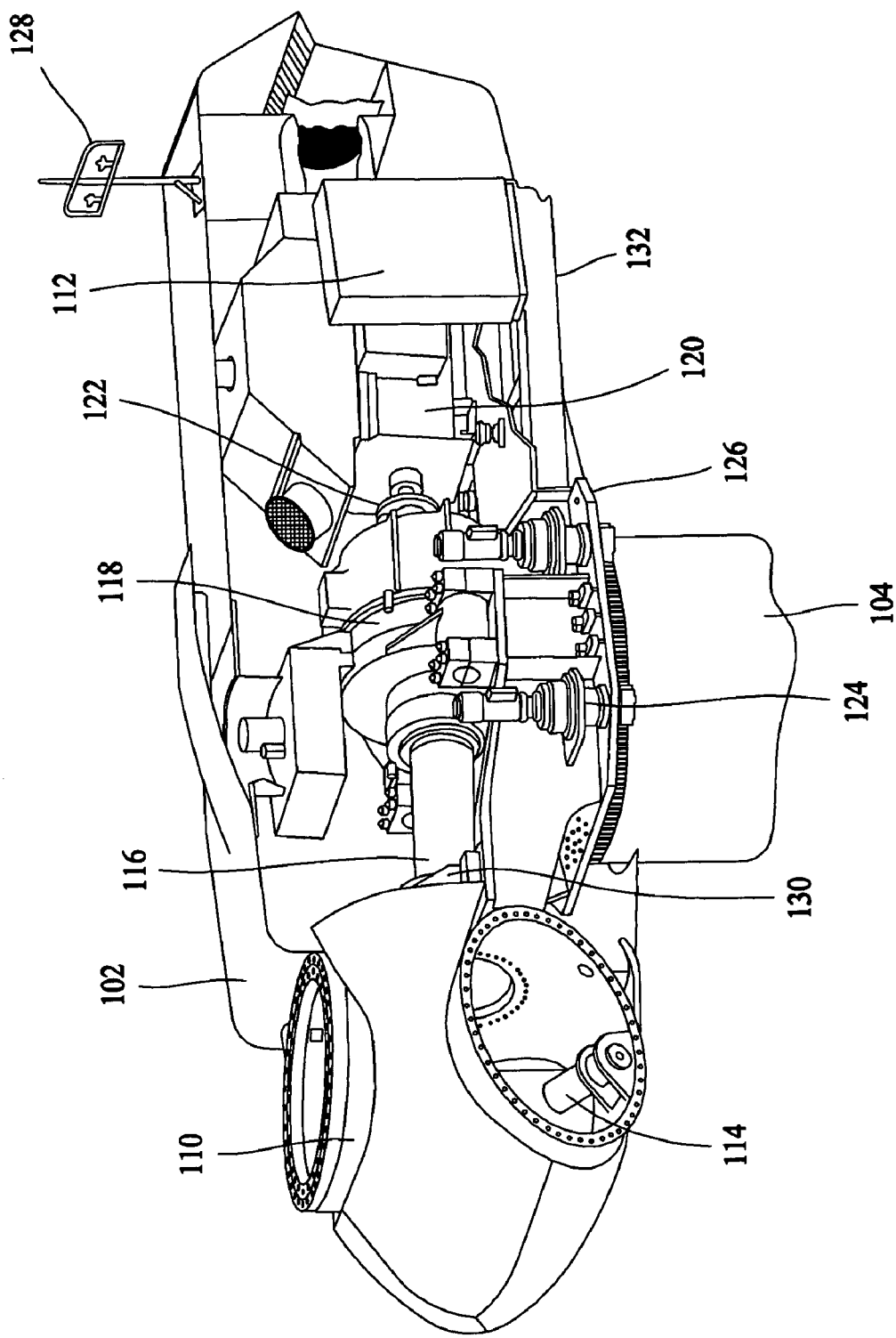
FIG. 2 is a cut-away perspective view of a nacelle of the exemplary wind turbine configuration shown in FIG. 1.

In some configurations and referring to FIG. 2, various components are housed in nacelle 102 atop tower 104 of wind turbine 100. The height of tower 104 is selected based upon factors and conditions known in the art. In some configurations, one or more microcontrollers within control panel 112 comprise a control system used for overall system monitoring and control including pitch and speed regulation, high-speed shaft and yaw brake application, yaw and pump motor application and fault monitoring. Alternative distributed or centralized control architectures are used in some configurations.

In some configurations, the control system provides control signals to a variable blade pitch drive 114 to control the pitch of blades 108 (not shown in FIG. 2) that drive hub 110 as a result of wind. In some configurations, hub 110 receives three blades 108, but other configurations can utilize any number of blades. In some configurations, the pitches of blades 108 are individually controlled by blade pitch drive 114. Hub 110 and blades 108 together comprise wind turbine rotor 106.

The drive train of the wind turbine includes a main rotor shaft 116 (also referred to as a "low speed shaft") connected to hub 110 via main bearing 130 and (in some configurations), at an opposite end of shaft 116 to a gear box 118. Gear box 118, in some configurations, utilizes a dual path geometry to drive an enclosed high speed shaft. In other configurations, main rotor shaft 116 is coupled directly to generator 120. The high speed shaft (not shown in FIG. 2) is used to drive generator 120, which is mounted on main frame 132. In some configurations, rotor torque is transmitted via coupling 122. Generator 120 may be of any suitable type, for example and without limitation, a wound rotor induction generator or a direct drive permanent magnet generator.

Yaw drive 124 and yaw deck 126 provide a yaw orientation system for wind turbine 100. Meterological boom 128 provides information for turbine control system 300 of FIG. 3, including wind direction and/or wind speed. In some configurations, the yaw system is mounted on a flange provided atop tower 104.

Figure 3:
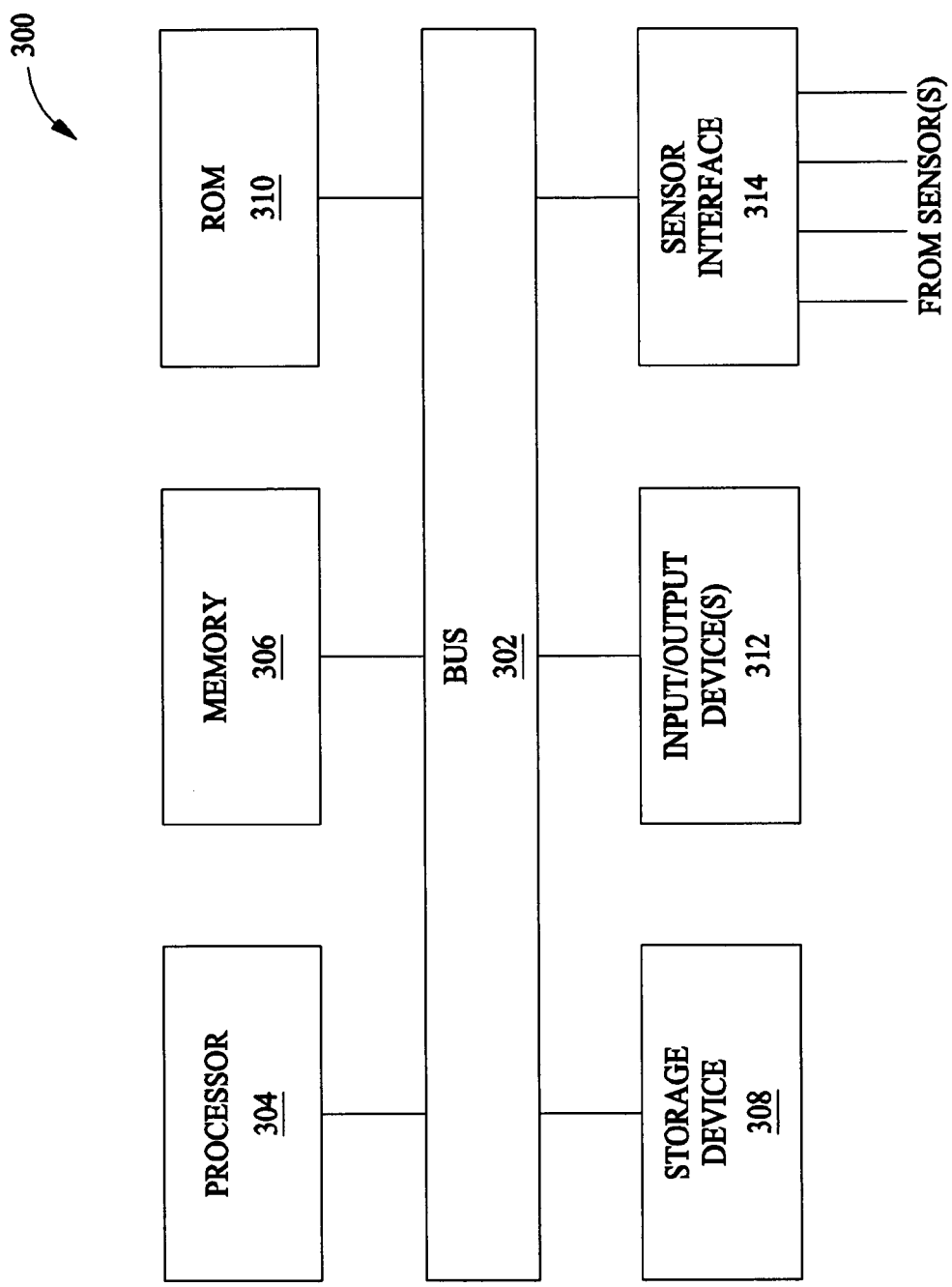
FIG. 3 is a block diagram of an exemplary configuration of a control system for the wind turbine configuration shown in FIG. 1.

In some configurations and referring to FIG. 3, a control system 300 for wind turbine 100 includes a bus 302 or other communications device to communicate information. Processor(s) 304 are coupled to bus 302 to process information, including information from sensors configured to measure displacements or moments. Control system 300 further includes random access memory (RAM) 306 and/or other storage device(s) 308. RAM 306 and storage device(s) 308 are coupled to bus 302 to store and transfer information and instructions to be executed by processor(s) 304. RAM 306 (and also storage device(s) 308, if required) can also be used to store temporary variables or other intermediate information during execution of instructions by processor(s) 304. Control system 300 can also include read only memory (ROM) and or other static storage device 310, which is coupled to bus 302 to store and provide static (i.e., non-changing) information and instructions to processor(s) 304. Input/output device(s) 312 can include any device known in the art to provide input data to control system 300 and to provide yaw control and pitch control outputs. Instructions are provided to memory from a storage device, such as magnetic disk, a read-only memory (ROM) integrated circuit, CD-ROM, DVD, via a remote connection that is either wired or wireless providing access to one or more electronically-accessible media, etc. In some embodiments, hard-wired circuitry can be used in place of or in combination with software instructions. Thus, execution of sequences of instructions is not limited to any specific combination of hardware circuitry and software instructions. Sensor interface 314 is an interface that allows control system 300 to communicate with one or more sensors. Sensor interface 314 can be or can comprise, for example, one or more analog-to-digital converters that convert analog signals into digital signals that can be used by processor(s) 304.

When rotor 106 is exposed to a rapid decrease in wind speed (which is often followed by a sudden increase in wind speed), there is a tendency to rapid pitch towards minimum pitch. To reduce rotor exposure, in some configurations of the present invention, control system 300 introduces a limit on minimum pitch and/or pitch rate that is dependent upon recent operating history. An operating history of the pitch of rotor blades 108 and/or of wind speed recorded by meterological boom anemometry 128 is saved. The operating history can be saved, for example, in a circular buffer maintained by processor(s) 304 in memory 306. This recent operating history can comprise, for example, pitch commands to pitch drives 114 (or any other data from which pitch movements and/or current pitch can be determined) and/or wind speed (or wind speed change) measurements. As used herein, the term "recent historical pitch-related data" refers to data comprising either pitch related data, wind speed related data, or a combination thereof. This recent historical pitch-related data can be saved periodically. If the data are saved periodically, the position within the buffer and the sampling rate can be used (for example) to determine the times at which the recorded pitches and/or wind speeds were measured. In some configurations, the recent historical pitch-related data are saved, along with clock times, only when significant changes in pitch and/or wind speed occur. The amount of memory required in either configuration can be determined empirically or by analysis, depending upon the range of conditions for which a reduction in peak operating deflection is desired. In either configuration, processor(s) 304 analyze the saved measurements to determine whether minimum pitch should be limited. If so, a minimum pitch is imposed on the pitch control for each blade.

It is permissible that processor(s) 304 be configured to analyze only whether rapid pitching toward minimum is occurring or only whether wind speed changes are occurring, as either condition may be indicative of the need to impose a pitch limit. For example, in some configurations only pitch data are recorded, and in others, only wind speed related data are recorded. However, in some configurations, both types of recent historical pitch related data are recorded, and in such configurations, processor(s) 304 can be configured to check for either or both occurrences. In such configurations, the presence of either rapid pitching toward minimum or wind speed changes may be considered indicative of the need to impose a pitch limit. What constitutes "rapid pitching," "sudden increases," and "a frequent basis" can be determined empirically or by analysis for particular configurations of rotor blades 108 and rotors 106, as can the "minimum pitch" that is suitable for given situations. Whether discovered empirically or by analysis, these definitions are later stored in a memory of wind turbine 100 and become predetermined conditions and values. In some configurations, these values are adaptively determined or predetermined values are adaptively adjusted.

Some configurations of the present invention provide hysteresis to delay the rapid pitch to minimum tendency, so that rotor exposure to a fall followed by a sudden rise in wind speed is reduced. In certain of these configurations, the hysteresis is provided in addition to a minimum pitch limit. In various configurations, the limit on minimum pitch based on recent operating history and/or hysteresis loop-provided delay is operative only during times of above-rated operation of wind turbine 100. Because the limit on minimum pitch in these configurations is imposed only in above-rated operation conditions, whether recent historical pitch-related data are stored and/or whether the stored data are analyzed at other times can be left as a design choice. For example, the storage and analysis may take place and a pitch limit may be determined, but the imposition of this limit can be inhibited when operation is determined to be within rated operation conditions. Other configurations may also inhibit the storage, analysis and/or determination of the minimum pitch limit.

Configurations of the present invention thus provide a reduction in peak operating deflections, loads, and/or peak rotational speeds on wind turbine rotors. Moreover, configurations of the present invention are useful as a supplement to various known dynamic control methods.

While the invention has been described in terms of various specific embodiments, those skilled in the art will recognize that the invention can be practiced with modification within the spirit and scope of the claims.

What is claimed is:

1. A method for reducing at least one of loads, deflections of rotor blades, or peak rotational speed of a wind turbine, said method comprising:
   controlling pitch angles of the rotor blades; and
   providing said pitch angle control with a hysteresis loop to delay said pitch control.

2. A method in accordance with claim 1 wherein said hysteresis is operative only when the wind turbine is operating above rated operating conditions.

3. A method in accordance with claim 1 further comprising utilizing an additional dynamic control method for said pitch control.

4. A wind turbine comprising a rotor having one or more rotor blades, said wind turbine configured to:
   control pitch angles of said rotor blades; and
   delay said pitch angle control utilizing a hysteresis loop.

5. A wind turbine in accordance with claim 4 wherein said hysteresis loop is operative only when the wind turbine is operating above rated operating conditions.

6. A wind turbine in accordance with claim 4 wherein said wind turbine is further configured to utilize an additional dynamic control method for said pitch control.

7. A method for reducing at least one of loads, deflections of rotor blades, or peak rotational speed of a wind turbine, said method comprising:
   storing recent historical pitch related data, wind related data, or both;
   analyzing the stored recent historical data to determine at least one of whether rapid pitching is occurring or whether wind speed decreases are occurring; and
   imposing a minimum pitch, a pitch rate limit, or both on pitch angle controls of the rotor blades conditioned upon results of said analysis.

8. A method in accordance with claim 7 wherein at least said imposition of a minimum pitch, a pitch rate limit, or both is further conditioned upon the wind turbine operating above rated operating conditions.

9. A method in accordance with claim 7 further comprising controlling pitch angles of said rotor blades utilizing a hysteresis loop to delay said pitch angle control.

10. A method in accordance with claim 9 wherein the hysteresis loop is operative only when the wind turbine is operating above rated operating conditions.

11. A method in accordance with claim 10 wherein at least said imposition of a minimum pitch, a pitch rate limit, or both is further conditioned upon the wind turbine operating above rated operating conditions.

12. A method in accordance with claim 9 wherein at least said imposition of a minimum pitch, a pitch rate limit, or both is further conditioned upon the wind turbine operating above rated operating conditions.

13. A method in accordance with claim 9 further comprising utilizing an additional dynamic control method for said pitch control.

14. A method in accordance with claim 7 further comprising utilizing an additional dynamic control method for said pitch control.

15. A wind turbine comprising a rotor having one or more rotor blades, said wind turbine further comprising a control system comprising at least one rotor blade pitch control output, said control system configured to:
   store recent historical pitch related data, wind related data, or both;
   analyze the stored recent historical data to determine at least one of whether rapid pitching is occurring or whether wind speed decreases are occurring; and
   impose a minimum pitch, a pitch rate limit, or both on said pitch control output of said rotor blades conditioned upon results of said analysis.

16. A wind turbine in accordance with claim 15 wherein said control system is further configured to impose said minimum pitch, said pitch rate limit, or both upon said wind turbine operating above rated operating conditions.

17. A wind turbine in accordance with claim 15 wherein said control system further comprises at least one hysteresis loop configured to delay said imposition of said minimum pitch, said pitch rate, or both.

18. A wind turbine in accordance with claim 17 wherein said hysteresis loop is configured to be operative only when the wind turbine is operating above rated operating conditions.

19. A wind turbine in accordance with claim 17 wherein said hysteresis loop is further configured to utilize an additional dynamic control method for said pitch control output.

20. A wind turbine in accordance with claim 15 wherein said control system is further configured to utilize an additional dynamic control method for said pitch control output.

* * * * *